No. 883,235. PATENTED MAR. 31, 1908.
F. RAUCH.
TREE HOLDER.
APPLICATION FILED JUNE 6, 1907.

WITNESSES:
O. R. Erwin
M. M. Schulz

INVENTOR
Frank Rauch
BY
Erwin & Wheeler
ATTORNEYS

UNITED STATES PATENT OFFICE.

FRANK RAUCH, OF MILWAUKEE, WISCONSIN.

TREE-HOLDER.

No. 883,235.　　　　Specification of Letters Patent.　　Patented March 31, 1908.

Application filed June 6, 1907. Serial No. 377,517.

*To all whom it may concern:*

Be it known that I, FRANK RAUCH, a citizen of the United States, residing at Milwaukee, county of Milwaukee, and State of Wisconsin, have invented new and useful Improvements in Tree-Holders, of which the following is a specification.

My invention relates to improvements in that class of tree holders in which the clamping mechanism of the holder is retained in contact with the tree and caused to impinge with more or less pressure according to the weight of the tree, and it pertains more especially to the means employed for pivotally connecting the several tree supported brackets with a single center piece upon which the base of the tree rests.

Figure 1:
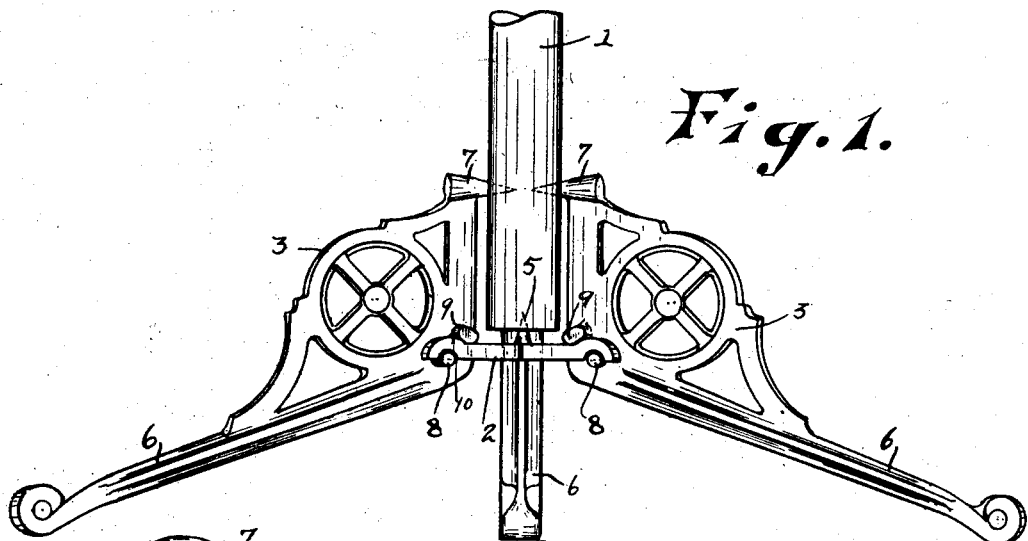
Figure 2:
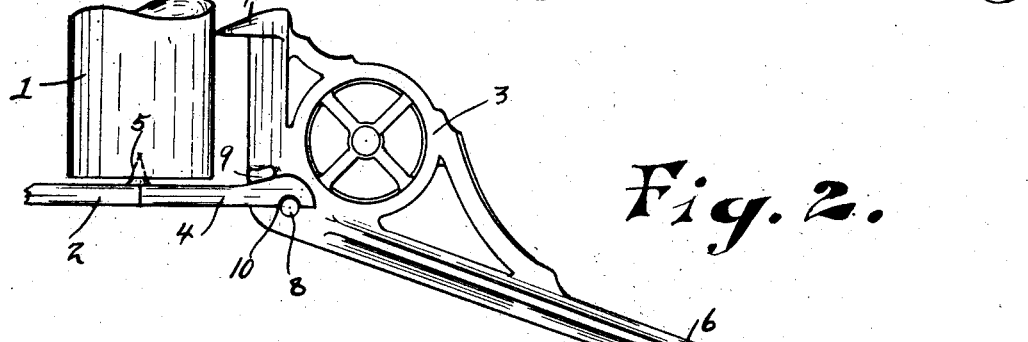
Figure 3:
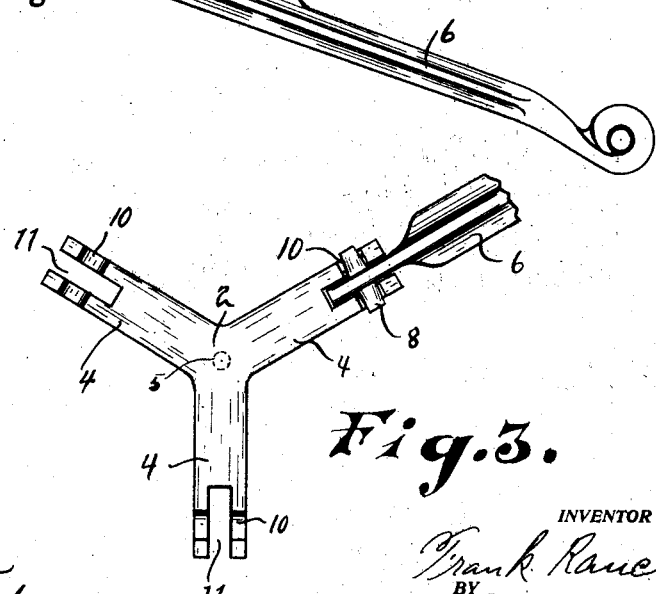

The construction of my invention is explained by reference to the accompanying drawings, in which, Figure 1 is a side view. Fig. 2 is a detail, and Fig. 3 a bottom view of the center piece.

Like parts are indentified by the same reference figures throughout the several views.

1 represents the tree, 2 the center piece upon which the tree is supported, and 3 the supporting brackets. The center piece 2 comprises the radial arms 4 and a central vertical barb 5 which is adapted to penetrate the lower end of the tree. The several brackets 3 comprise the legs 6, inwardly projecting barbs 7 which are adapted to penetrate the sides of the tree, lateral projections 8 upon which the radial arms 4 of the center piece are adapted to rest, and lateral projections 9 against which the upper side of said radial arms 4 are adapted to bear. The radial arms 4 are provided on their lower sides with concave recesses 10 for the reception of the lateral projections 8, and recess 11 for the reception of the sides of the brackets 3.

It will now be understood that when desirous to connect such parts together, the sides of the several brackets 3 are inserted between the lateral projections 8 and 9 formed on the respective sides of the bracket 3, whereby as the downward pressure is brought to bear on the center piece 2 said projections 8 and 9 are adapted to impinge upon the respective sides of the arms 7, whereby said center piece is supported from said legs. This being done the tree is centrally located upon the center piece 2 between the several barbs 7, when owing to the downward pressure of the tree upon the center piece 2, said barbs 7 are caused to penetrate the vertical sides of the tree and thereby rigidly support said tree in place between the converging ends of said barbs. Thus it is obvious that the barbs 7 will be forced with greater or less pressure against the vertical sides of the tree according to the downward pressure of the tree upon said center piece.

Having thus described my invention what I claim as new and desire to secure by Letters Patent is,

In a tree holder of the class described, a central member comprising a plurality of radial arms and a central barb, the other end of each of said arms having recesses on the under side and projections on the upper side above the recesses in combination with a plurality of supporting brackets, integrally formed radial barbs, and supporting lugs formed on each side of each of said brackets, some of said lugs engaging each of the radial arms above the projection and others, each of the radial arms beneath the recesses, whereby said radial arms and said brackets are interlocked all substantially as and for the purpose specified.

In testimony whereof I affix my signature in the presence of two witnesses.

FRANK RAUCH.

Witnesses:
　　LEVERETT C. WHEELER,
　　O. R. ERWIN.